United States Patent [19]

Reiter

[11] 4,167,079

[45] Sep. 11, 1979

[54] TRIM FENCE

[76] Inventor: Joseph Reiter, 11255 Suzor Cote, Montreal, Quebec, Canada

[21] Appl. No.: 945,213

[22] Filed: Sep. 25, 1978

[51] Int. Cl.² ............................................. A01G 1/08
[52] U.S. Cl. .......................................... 47/33; 256/19
[58] Field of Search ........................ 256/19, 1, 22, 21; D25/38; 47/33, 32

[56] References Cited

U.S. PATENT DOCUMENTS

| 1,167,689 | 1/1916 | Gichner | 256/22 |
| 2,842,344 | 7/1958 | Todd | 256/21 |
| 2,865,136 | 12/1958 | Scott et al. | 47/33 |
| 2,877,600 | 3/1959 | Slate | 47/33 |
| 3,495,352 | 2/1970 | Sbare | 47/33 |

Primary Examiner—Andrew V. Kundrat
Attorney, Agent, or Firm—Swabey, Mitchell, Houle, Marcoux & Sher

[57] ABSTRACT

A trimming fence comprised of individual modules each having a pair of planar parallel surfaces and sidewalls forming the V shape end. Each sidewall is formed by intersecting planar surfaces forming a V including an obtuse angle. The planar surfaces of the sidewalls converging at a linear edge at the apex of the V, the edge having a V shaped outline which is in a plane at an angle other than a right angle to the parallel planar surfaces of the member.

6 Claims, 7 Drawing Figures

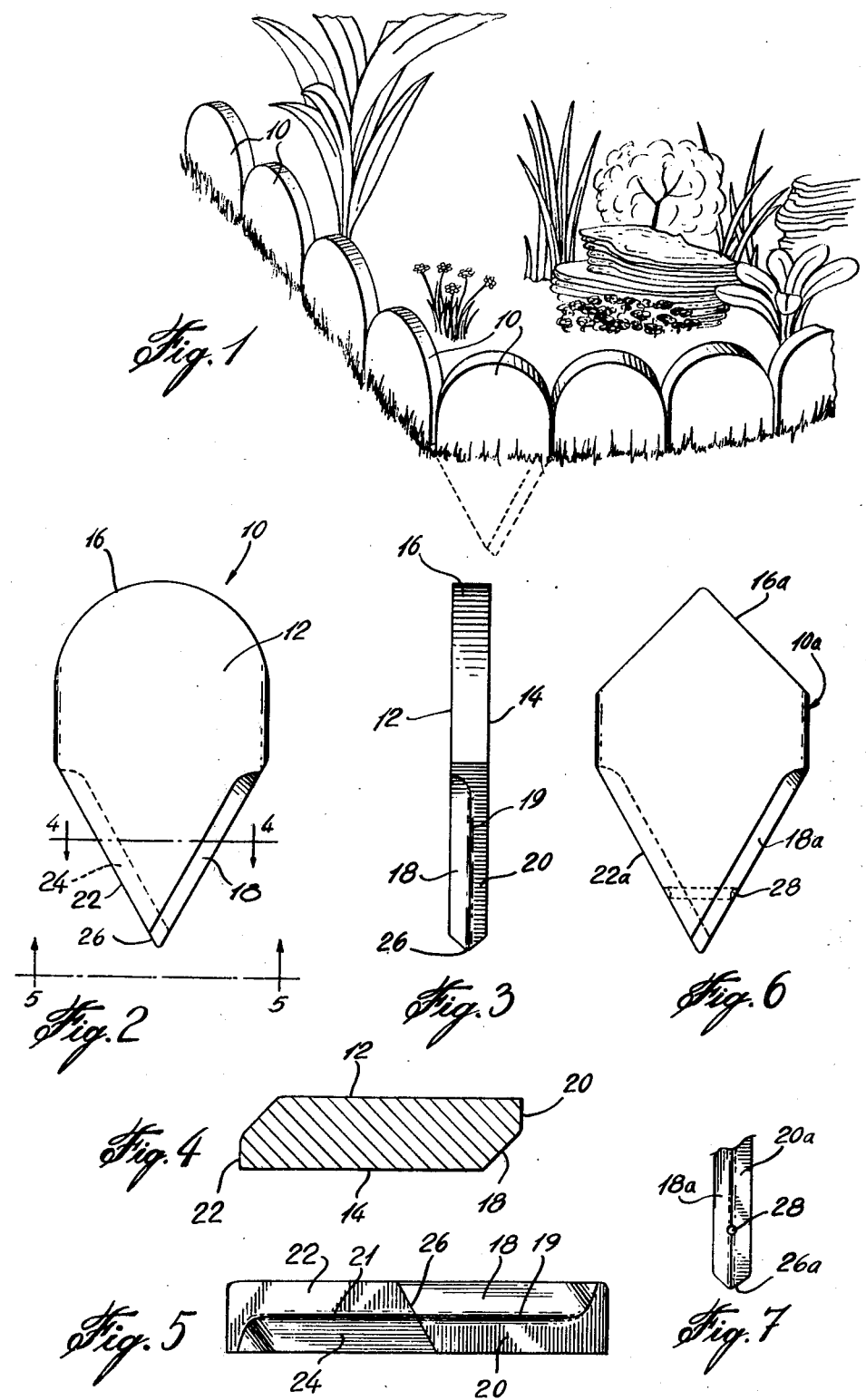

TRIM FENCE

BACKGROUND OF THE INVENTION

1. Field of the Invention

The present invention relates to a fence and more particularly to a fence for trimming flower gardens and the like, and to a modular element forming the fence.

2. Description of the Prior Art

Heretofore such fences, which measure only a few inches in height, have been made conventionally, that is, with spaced apart posts, cross members between the posts and with upright slats mounted to the cross members. Pieces of corrugated plastics sheet or expanded metal have also been used. In the case of conventional type fencing, the installation cost is of course out of proportion to the size of the fence. The latter fencing is inexpensive, but difficult to install since complete sections must be inserted into the ground to at least 50% of its height.

SUMMARY OF THE INVENTION

It is an aim of the present invention to provide a simple trimming module which can be easily pressed into the soil to 50% of its height.

A construction in accordance with the present invention includes a flat member of predetermined thickness having a pair of parallel planar surfaces. The member terminates in a V shaped end, with each side surface forming the V shaped end being formed by intersecting planar surfaces forming a V including an obtuse angle. The planar side surfaces converging at a linear edge have a V outline which is in a plane at an angle to the parallel planar surfaces of the member.

In a more specific embodiment of the present invention the V shaped end has an extent equal to or greater than 50% of the overall extent of the member.

BRIEF DESCRIPTION OF THE DRAWINGS

The invention will now be described with reference to the accompanying drawing which shows a preferred form thereof and wherein;

FIG. 1 is a perspective view of a plurality of fence modules set up in a garden trimming situation;

FIG. 2 is a front elevation of a typical fence module;

FIG. 3 is a side elevation of the fence module shown in FIG. 2;

FIG. 4 is a horizontal cross-section taken along lines 4—4 of FIG. 1;

FIG. 5 is an end view taken along lines 5—5 of FIG. 2;

FIG. 6 is an elevation view of another embodiment of the fence module;

FIG. 7 is a fragmentary side elevation of the embodiment shown in FIG. 6.

DESCRIPTION OF THE PREFERRED EMBODIMENTS

Referring now to the drawings, and especially figures 2 to 5 there is shown a fence module 10 having a pair of planar parallel surfaces 12 and 14 bounded by a rounded sidewall 16.

The other end of the module 10 has a V shape outline and the apex of the V includes an acute angle. Each side edge wall of the V shaped portion of the module 12 includes intersecting planar surfaces 18 and 20 on one side thereof and surfaces 22 and 24 on the other side thereof. Surfaces 18, 20, 22 and 24 are cut in such a way that the apex of the converging surfaces presents a linear edge contained in a plane at an angle to the planar surfaces 12 and 14.

In side elevation the linear edge 26 also has a V outline. The intersecting planar surfaces 18 and 20, 22, 26 intercept in such a way as to form an obtuse angle therebetween. The intersecting line 19 and the intersecting line 21 lie in a plane which is parallel to the surfaces 12 and 14.

The module 10 is preferably made from wood boards and can advantageously be applied to lengths of board which have no other practical value. It is evident however that the fence module can be made from a hard plastic material and could well be formed from metal. In other words any suitable material which is hard enough to receive an impact on the edge 16 and which will be rigid enough to penetrate the ground when pressed into the ground would be suitable.

It is intended to use the modules in an edge to edge relation such as shown in FIG. 1, by placing a plurality of such modules, which will form a trimming fence for a flower garden.

The peculiar shape of the V shape end along with the linear edge 26 which is at a slight angle to the planar surfaces 12 and 14 gives the point of penetration action when pressure is applied to the top edge 16 of the fence module 10.

The angle of the linear edge 26 and intersecting edges 18, 20, 22 and 24 act somewhat as a screw tip for a fastener.

In another embodiment of the module such as shown in FIGS. 6 and 7 a bore 28 is provided traversing the V shaped end. The bore 28 will act as an earth anchor when the module is in the ground.

Of course, the top edge wall 16 can be varying shapes since the top edge is provided for ornamentation.

I claim:

1. A modular fence member comprising a flat member of predetermined thickness having parallel planar surfaces, the member terminating in a V shaped end with sidewalls forming the V shaped end, each sidewall having intersecting planar side surfaces forming a V including an obtuse angle, the planar side surfaces converging at a linear edge at the apex of the V shaped end and the linear edge has a V shape outline which is in a plane at an angle other than a right angle to the parallel planar surfaces of the member.

2. A member as defined in claim 1 wherein the intersecting side surfaces at each sidewall intersect at lines contained in a plane parallel and intermediate between the parallel planar surfaces of the member.

3. A member as defined in claim 2 wherein each of the sidewalls forming the V shaped end includes one side planar surface at right angles to an adjacent planar surface of the member with the other planar side surface being at an angle thereto.

4. A member as defined in claim 1 wherein the longitudinal extent of the V shaped end is equal to or greater than 50% of the overall extent of the member.

5. A member as defined in claim 1 wherein the material forming the member is wood.

6. A member as defined in claim 3 wherein a bore extends from one sidewall to the other in the median plane containing the intersection lines.

* * * * *